(12) United States Patent
Chuang et al.

(10) Patent No.: US 7,246,240 B2
(45) Date of Patent: Jul. 17, 2007

(54) QUANTUM DIGITAL SIGNATURES

(75) Inventors: Isaac Chuang, Cambridge, MA (US); Daniel Gottesman, Berkeley, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 659 days.

(21) Appl. No.: 10/134,037

(22) Filed: Apr. 26, 2002

(65) Prior Publication Data

US 2002/0199108 A1 Dec. 26, 2002

Related U.S. Application Data

(60) Provisional application No. 60/286,616, filed on Apr. 26, 2001.

(51) Int. Cl.
*H04L 9/00* (2006.01)
*H04K 1/00* (2006.01)

(52) U.S. Cl. ........................................ 713/176; 380/256

(58) Field of Classification Search ................ 713/176; 380/256
See application file for complete search history.

(56) References Cited

U.S. PATENT DOCUMENTS

| 5,515,438 | A | | 5/1996 | Bennett et al. | ................ | 380/21 |
| 5,768,378 | A | * | 6/1998 | Townsend et al. | ........... | 380/256 |
| 5,966,224 | A | | 10/1999 | Hughes et al. | ............... | 359/112 |
| 5,999,285 | A | * | 12/1999 | Brandt et al. | ................ | 398/212 |
| 6,678,379 | B1 | * | 1/2004 | Mayers et al. | ............... | 380/278 |
| 6,778,669 | B1 | * | 8/2004 | Lehureau | .................... | 380/256 |
| 2002/0106084 | A1 | * | 8/2002 | Azuma et al. | .............. | 380/263 |

FOREIGN PATENT DOCUMENTS

JP 175762/2000 * 6/2000

OTHER PUBLICATIONS 25 years of Quantum Cryptography: Brussard and Crepeau, Jul. 31, 1996.*
Quantum Cryptography, Bennett, Brussard, Giles, and Ekert, Scientific American, Oct. 1992.*
Quantum Information Theory: Bennett, Shor, IEEE Tras. on Info. Theory. Oct. 6, 1998.*

(Continued)

*Primary Examiner*—Gilberto Barron, Jr.
*Assistant Examiner*—Farid Homayounmehr
(74) *Attorney, Agent, or Firm*—Norma E. Henderson (57) ABSTRACT

Systems and methods for providing secure quantum digital signatures. In one embodiment, a digital signature user creates a plurality of identical "public" keys having one or more bits and a corresponding quantum mechanical one-way function. Quantum digital signature recipients use a "swap test" to check the validity of a copy of the key, and compare the test results with others. The quantum digital signature user sends a signed message over any channel, including an insecure channel. The recipients evaluate the signed message, and quantify the number of incorrect keys. The message is deemed valid and original, or forged and/or tampered with, when the number of incorrect keys is less than a lower threshold, or exceeds an upper threshold, respectively. For an intermediate number of incorrect keys, the recipients determine message authenticity by comparing observations. Hardware useful for application of the method is disclosed.

31 Claims, 2 Drawing Sheets

OTHER PUBLICATIONS

Quantum Communication Moves to Unknown: Deutsch, Ekert, Physics World, Jun. 1993.*

Applied Cryptography, authored by Bruce Schneier, Copyright 1996, Published by John Wiley, ISBN: 0-471-11709-9, Section 3.2.*

Bethune et al., "An Autocompensating Fiber-Optic Quantum Cryptography System Based on Polarization Splitting of Light", pp. 100-108, IEEE Journal of Quantum Electronics, vol. 36, No. 3, Mar. 2000.

Buhrman et al., "Quantum Fingerprinting" (2001), 1 page, Abstract, retrieved from the Internet on Sep. 25, 2001, <URL:http://www.cpsc.ucalgary.ca/~cleve/pubs/fingerprint_sum.html>.

Buhrman et al., "Quantum fingerprinting", pp. 1-8, arXiv:quant-ph/0102001 Feb. 1, 2001.

Gottesman et al., "Quantum Digital Signatures", pp. 1-4, arXiv:quant-ph/0105032 v1, May 8, 2001.

Mullins, "The Topsy Turvy World of Quantum Computing" pp. 42-49, Advanced Technology, IEEE Spectrum, Feb. 2001.

* cited by examiner

QUANTUM DIGITAL SIGNATURES

CROSS-REFERENCE TO RELATED APPLICATIONS

This application claims the benefits of U.S. provisional application Ser. No. 60/286,616, filed Apr. 26, 2001, which application is incorporated herein in its entirety by reference.

GOVERNMENT RIGHTS

This invention was made with government support under Contract No. F30602-01-2-0521 awarded by the Defense Advanced Research Projects Agency. The government may have certain rights in the invention.

FIELD OF THE INVENTION

This invention relates generally to cryptographic methods. More particularly, the invention relates to cryptographic methods that use quantum states to effect digital signatures.

BACKGROUND OF THE INVENTION

Digital signatures are useful in commerce that is conducted at a distance. It is A often useful and necessary to communicate one's offer or acceptance of a commercial transaction in writing, using any one of the many forms of electronic communications presently available, such as facsimile (hereinafter "fax"), electronic mail (hereinafter "e-mail"), and documents and/or images in various electronic formats. In particular, it is now the law in the United States that electronic signatures carry the same legal effect as a handwritten signature provided in the "old-fashioned" manner by the use of pen and ink in interstate and international commerce, with certain exceptions (See the Electronic Signatures in Global and National Commerce Act, Public Law 106-229 (2000)). However, the concept of digital signatures is not new, having been proposed in 1976 by Diffie and Hellman.

In the case of traditional handwritten signatures, authentication can be provided by having a signature witnessed, for example by a notary, by the analysis of handwriting samples by experts, and the like. In the case of a digital signature, the problem is to authenticate a "signature" represented by a series of symbols, such as 1's and 0's, transmitted over an insecure communication channel from an unseen source. One major goal of classical cryptography is to certify the origin of a message.

In this document, we shall follow the conventional usage in the literature of quantum computing, in which a first person, called Alice, and a second person, called Bob, are individuals who perform the various manipulations that are discussed. The names Alice and Bob have become customary in such discussions, rather than using arbitrary names or designations.

Classical digital signature schemes can be created out of many one-way functions. $f(x)$ is a one-way function if it is easy to compute $f(x)$ given x, but computing x given $f(x)$ is very difficult. This allows the following digital signature scheme: Alice chooses $k_0$ and $k_1$, and publicly announces $f$, $(0,f(k_0))$ and $(1,f(k_1))$. Later, to sign a single bit b (where b is 0 or 1), Alice presents (b, $k_b$). The recipient can easily compute $f(k_b)$ and check that it agrees with Alice's earlier announcement, and since $k_0$ and $k_1$ were known only to Alice, this certifies that she must have sent the message.

The use of public key digital signature schemes, in which a publicly available key is used to prepare a message and/or signature, and a privately held key is required to decode the message and/or signature, is one approach to providing digital signatures based on a one-way function. The security of all such public key digital signature schemes presently depends on the inability of a forger to solve certain difficult mathematical problems, such as factoring large numbers. The basis for such public key systems is the belief that the problem to be solved involves such great computational difficulty that present computer systems cannot solve the problem in a reasonable period of time. However, improved computer systems, or improved computational methods, can provide the capability to solve such problems in reasonable time periods. In particular, there is no known mathematical proof that such classical systems for the provision of digital signatures are incapable of being defeated by an adversary with sufficient computational power and mathematical capability. For example, with a quantum computer, the solution of certain difficult problems, such as factoring, becomes tractable. With the use of quantum computers, digital signature systems that operate according to classical principles can be defeated, and signatures can be forged. In the terminology of those of skill in the cryptologic arts, the provision of a false signature that is accepted as genuine is referred to as existential forgery.

SUMMARY OF THE INVENTION

A digital signature scheme allows one person to create documents whose origin can be verified by one or more recipients. Much like a handwritten signature on a paper document, a digital signature authenticates the source of an electronic document, ensures that it has not been tampered with, makes impossible the repudiation of the document and its contents, and assures that a third party will accept a genuine signature as valid.

The present invention provides an approach for creating digital signatures using quantum systems. Unlike prior methods, this scheme is absolutely secure—that is, it cannot be defeated computationally. The invention employs a public key, which is constructed from quantum bits, and a private key, which is a set of classical bits. Copies of the public key are distributed to a number of recipients in the first stage of the protocol. To sign a message, the sender reveals a portion of the private keys; since only she knows these, they authenticate her as the source of the message. The signature cannot be forged, and multiple recipients will always agree on the validity of a signature.

The invention can be reduced to practice using a variety of technologies and does not require a quantum computer for implementation; rather, even free-space or fiber-optic communications together with small quantum memories and simple quantum circuits with a few quantum gates suffice (see Nielsen and Chuang, *Quantum Computation and Quantum Information* (Cambridge University Press 2000), hereafter "Nielsen and Chuang").

In one aspect, the invention relates to a method of authenticating information from a source, such that one or more recipients will agree on the authenticity of the source of the information, the method comprising the step of using quantum states to create a digital signature associated with the information. In one embodiment, the digital signature is created in accordance with a quantum one-way function, the function being employed to create keys used for the authentication of the information source. In one embodiment, the digital signature is used to create a key which is secure for encrypted transmission of information in one direction In one embodiment, the information being authenticated is classical information. In one embodiment, the quantum function transforms classical information into at least one quantum state. In one embodiment, the digital signature comprises a single quantum bit. In one embodiment, the digital signature comprises a string of quantum bits. In one embodiment, the digital signature can be used for authenticating only one message from the information source.

In another aspect, the invention relates to a method of authenticating information from a source, such that one or more recipients will agree on the authenticity of the source of the information, the method comprising the step of decoding quantum states to determine the validity of a digital signature associated with the information. In one embodiment, the quantum states are decoded using a quantum one-way function, the function being employed in conjunction with keys to determine the authenticity of at least one of (i) the information source and (ii) the information. In one embodiment, the digital signature is secure for encrypted transmission of information in one direction In one embodiment, the information being authenticated is classical information. In one embodiment, the quantum function transforms classical information into at least one quantum state. In one embodiment, the digital signature comprises a single quantum bit. In one embodiment, the digital signature comprises a string of L quantum bits, where L is an integer greater than one. In one embodiment, the digital signature can be used for authenticating only one message from the information source.

In yet another aspect, the invention features a method of providing a digital signature for use in electronic commerce. The method comprising the step of using quantum states to create a digital signature. In one embodiment, the method further comprises the step of publishing a public key associated with the digital signature. In one embodiment, using quantum states to create the digital signature comprises creating one or more one way functions associated with the public key. In one embodiment, the method further comprises the step of associating the digital signature with information for transmission in commerce.

In still another aspect, the invention features a method of providing a digital signature for use in electronic commerce. The method comprising the step of decoding quantum states to determine the authenticity of a digital signature. In one embodiment, the method further comprises the step of retrieving a public key associated with the digital signature. In one embodiment, decoding quantum states to determine the authenticity of the digital signature comprises employing one or more one way functions associated with the public key. In one embodiment, the method further comprises the step of associating the digital signature with information for transmission in commerce.

In a further aspect, the invention relates to a system for providing a digital signature. The system comprises a quantum state generator for creating a digital signature comprising quantum states. In one embodiment, the digital signature comprises quantum states that encode the provable truth or falsity of at least one condition selected from the group consisting of a signature incapable of being existentially forged, a signature that authenticates a transmission as arriving in uncorrupted form from a known source, a signature that is incapable of being repudiated by the known source, and a signature the authenticity of which is unanimously agreed to by a number of recipients greater than one. In one embodiment, the system further comprises an optical communication channel over which the digital signature is communicated. In one embodiment, the system further comprises a secure communication channel over which the digital signature is communicated. In one embodiment, the system further comprises an insecure communication channel over which the digital signature is communicated.

In still a further aspect, the invention relates to a system for validating a digital signature. The system comprises a quantum state decoder for determining the authenticity of a digital signature comprising quantum states. In one embodiment, the digital signature comprises quantum states that encode the provable truth or falsity of at least one of (i) a signature incapable of being existentially forged, (ii) a signature that authenticates a transmission as arriving in uncorrupted form from a known source, (iii) a signature that is incapable of being repudiated by the known source, and (iv) a signature the authenticity of which is unanimously agreed to by a number of recipients greater than one. In one embodiment, the system further comprises an optical communication channel over which the digital signature is communicated. In one embodiment, the system further comprises a secure communication channel over which the digital signature is communicated. In one embodiment, the system further comprises an insecure communication channel over which the digital signature is communicated.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

We present a quantum digital signature scheme which is absolutely secure, even against powerful quantum cheating strategies. It allows a sender (Alice) to sign a message, so that the signature can be validated by one or more different people, and all will agree either that the message came from Alice or that it has been tampered with. We then discuss systems upon which such a system can be implemented, including a variety of hardware embodiments.

Our quantum digital signature scheme is based on a quantum analogue of a one-way function which, unlike any classical function, is provably secure from an information-theoretic standpoint, no matter how advanced the enemy's computers. The key idea we introduce is a one-way function whose input is a classical bit-string k, and whose output is a quantum state $|f_k\rangle$ (versus, for instance, a function which maps quantum states to quantum states). As an aside, in the description that follows, as is known to those of skill in the theoretical physics arts, the symbol $\langle\psi|$ denotes a final condition of a quantum mechanical system represented by a wave function $\psi$ and is a vector called a "bra," while the symbol $|\phi\rangle$ denotes an initial condition of the quantum mechanical system represented by a wave function φ and is a vector called a "ket," while the symbol <ψ|H|φ> denotes the energy of a system that transforms to the condition represented by ψ from the condition represented by φ if H is the Hamiltonian or energy matrix describing the system. Like the above classical scheme, we will require O(m) quantum bits (hereinafter "qubits") to sign a m-bit message. It is not sufficient, however, to simply plug in $|f_K\rangle$ in place of $f(k)$. First, due to the no-cloning theorem, there can be no perfect equality test for quantum states. Also, as we show below, the nature of quantum states provides Alice with non-classical cheating strategies, and eavesdroppers with non-classical forgery mechanisms. And unlike classical schemes, only a limited number of copies of the public key can be issued, or the scheme becomes insecure. Despite these difficulties, the protocol we present, when used correctly, allows the probability of any security failure to be made exponentially small with only polynomial expenditure of resources.

Let us begin with the quantum one-way function. Suppose we take all classical bit strings k of length L, and assign to each one a quantum state $|f_k\rangle$ of n qubits. Further, let the states be nearly orthogonal: $|\langle f_k|f_{k'}\rangle| \leq \delta$ for $k \neq k'$; this allows L to be much larger than n. Buhrman, Cleve, Watrous, and de Wolf ("Quantum fingerprinting," Phys. Rev. Letts., vol 87, page 167902, 2001; also arXiv:quant-ph/0102001 Feb. 1, 2001) introduced one such family as quantum fingerprints, in which $L=O(2^n)$ and $\delta \approx 0.9$. Another family is provided by the set of stabilizer states, with $L=n^2/2+o(n^2)$, and $\delta=1/\sqrt{2}$. Both these sets are easy to create with a standard set of universal quantum gates. A third family of interest uses just n=1 qubit per state, and consists of the states $\cos(j\theta)|0\rangle + \sin(j\theta)|1\rangle$, for $\theta = \pi/2^L$, and integer j. This family for any value of L, and gives $\delta = \cos\theta$.

The mapping $k \mapsto |f_k\rangle$ acts as a sort of "quantum one-way function" because it is impossible to invert, but easy to compute and verify. Holevo's theorem puts limits on the amount of classical information that can be extracted from a quantum state; in particular, measurements on n qubits can give at most n classical bits of information. Thus, given t copies of the state $|f_k\rangle$, we can learn at most $t_n$ bits of information about k, and when $L-t_n \gg 1$, our chance of successfully guessing the string k remains small.

We take for granted certain properties of classical functions which are no longer so straightforward quantum-mechanically. Given two outputs $|f_k\rangle$ and $|f_{k'}\rangle$, we ascertain that $k=k'$ using a simple quantum circuit, which we shall call the swap-test. Take the states $|f_k\rangle$ and $|f_{k'}\rangle$, and prepare a single ancilla qubit in the state $(|0\rangle+|1\rangle)/\sqrt{2}$. Next, perform a controlled-swap (for example using a Fredkin gate) with the ancilla qubit as control and $|f_k\rangle$ and $|f_{k'}\rangle$ as targets. Then perform a Hadamard operation on the ancilla qubit and measure it. If the result is $|0\rangle$, then the swap-test is passed; this always happens if $|f_k\rangle = |f_{k'}\rangle$. Otherwise, if $|\langle f_k|f_{k'}\rangle| \leq \delta$, the result $|0\rangle$ occurs with probability at most $(1+\delta^2)/2$. If the result is $|1\rangle$ then the test fails; this happens only when $k \neq k'$ and occurs with probability $(1-\delta^2)/2$. Clearly the swap test works equally well even if the states are not outputs of the function $f$—if the states are the same, they always pass the swap test, while if they are different, they sometimes fail.

Another important property is the ability to verify the output of the function:

given k, it is possible to straightforwardly verify that a state $|\psi\rangle = |f_k\rangle$. Since the function $|k\rangle|0\rangle \mapsto |k\rangle|f_k\rangle$ is easy to compute, one simply performs the inverse operation, and measures the second register. If $|\psi\rangle \neq |f_k\rangle$ the measurement result will be nonzero with probability $1-|\langle\psi|f_k\rangle|^2$.

Blindly modifying classical cryptographic protocols to use quantum one-way functions will generally fail. First, given the output of a classical one-way function, someone with limited computational ability can learn nothing at all about the input, whereas $|f_k\rangle$ always leaks a limited amount of information about k, the input to the quantum one-way function. This is why in our signature scheme, Alice must limit the number of copies of her public keys in circulation. Second, verification of the identity of $|f_k\rangle$ can only be done with some error. Third, quantum cheating strategies become available; for example, Alice (the person preparing the state) can prepare an entangled initial state, which enables her to delay choosing k until after she has given $|f_k\rangle$ away. An entangled state is one in which two quantum mechanical objects, such as photons or spins represented as having a superposition of states, are connected in such a way that measuring (or otherwise disturbing) one object causes that object to decay into a defined state, and simultaneously causes the other, entangled, object to decay to the same state. This fact effectively precludes the use of quantum one-way functions to perform bit commitment, which is one application of classical one-way functions. This is so because one of a pair of entangled objects can be used to communicate from Alice to Bob, with the possibility that Alice will subsequently "change" the state of the object sent to Bob by manipulating the entangled object she retains in her control. However, only Alice has the ability to change the state, which enables use of quantum one-way functions to perform digital signatures, as explained below.

Our digital signature protocol consists of two stages. The first step is the key distribution stage, where Alice creates and distributes quantum states which we shall refer to as her public keys. The public keys are "public," in the sense that no particular security measures are necessary in distributing them. If a number of copies fall into the hands of potential forgers, the protocol remains secure, provided the honest recipients receive valid keys. Classically, it is much easier to deal with identical public keys than with private keys that vary from recipient to recipient. The only purpose of our key distribution stage is to check that the public keys are truly indistinguishable. In the second stage of the protocol, Alice sends a classical message, and the t recipients use the public keys to verify that the message was sent by Alice. We shall initially describe how Alice sends one bit, b; multiple bits could be sent by repeating the protocol, but we describe a more efficient method below.

All participants in the protocol will know how to implement the map $k \mapsto |f_k\rangle$. All participants will also know two numbers, $c_1$ and $c_2$, thresholds for acceptance and rejection A used in the protocol. A bound on the allowed value of $c_2$ will be given below as part of the proof of security. The value $c_1$ can be zero in the absence of noise. The gap $c_2-c_1$ limits Alice's chance of cheating. We assume perfect devices and channels throughout this analysis, but our protocol still works in the presence of weak noise by letting $c_1$ be greater than zero. In other embodiments, other minor adjustments, which are not critical and well within the skill of those in the art, may be made.

Figure 1:
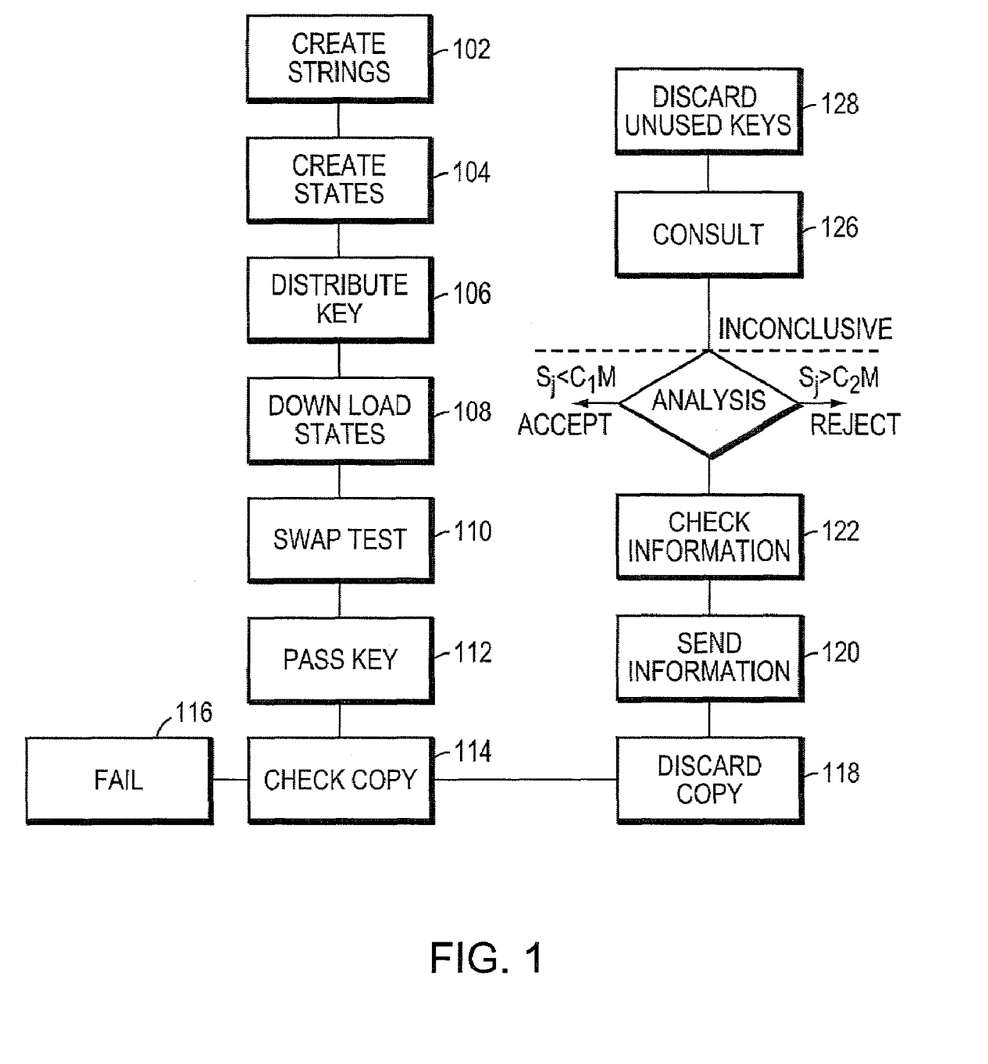
FIG. 1 is a flow diagram that shows the steps in an exemplary embodiment of a method of operation of the invention.

Turning to FIG. 1, which is a flow diagram that shows the steps in an exemplary embodiment of a method of operation of the invention, the key distribution stage works as follows:

1. Alice creates a set $\{k_0^j, k_1^j\}$, $1 \leq i \leq M$, of pairs of L-bit strings, as represented in step 102. The $k_0$'s will be used to sign 0's in the message, and the $k_1$'s will be used to sign 1's. Note $k_0^j$ and $k_1^j$ are chosen independently and randomly for each i.

2. Alice creates 2t copies of each of the states $\{|fk_0^j\rangle, |fk_1^j\rangle\}$, as represented in step 104. These will be Alice's public keys.
3. Alice sends her public keys to a key distribution center, as indicated in step 106.
4. Each of the t recipients downloads two copies of each $\{|fk_0^j\rangle, |fk_1^j\rangle\}$, as indicated for a group of t=3 recipients in step 108. One copy will be used to verify the message, and one to test for Alice cheating. The public keys have been labeled by Alice, so the recipients know which key is which (but not the identities of the individual keys).
5. Finally, for each value of i, the recipients verify that they all received the same public keys using the swap test. Each recipient first performs a swap-test between their two keys, as indicated at step 110. Then each passes one copy to a single recipient, as indicated at step 112. That recipient checks that these t test keys remain unchanged when any pair is swapped, as indicated at step 114. If any of the public keys fail the test, the protocol is aborted and each recipient so informs the from whom he or she received a key, and/or the person to whom he or she sent a key, as indicated at step 116. Otherwise, as indicated at step 118, the test is passed, and the recipients discard the test keys, keeping one copy of the public key originally obtained in step 108.

Assuming all recipients' public keys pass the swap test, all the recipients should now have identical public keys. However, a dishonest Alice may create states which pass the swap test but are different for different recipients. Nevertheless, all the keys are equivalent in the sense that on average, each recipient will find a similar number of correct keys for a given message. Alice can now send a message b using the following procedure, as shown in FIG. 1:

1. Alice sends the signed message $(b, k_b^1, k_b^2, \ldots, k_b^M)$ over an insecure classical channel, as indicated in step 120. Thus, Alice reveals the identity of half of her public keys.
2. Each recipient of the signed message checks each of the revealed public keys to verify that $k_b^j \mapsto |f_k\rangle$, as indicated in step 122. Recipient j counts the number of incorrect keys; let this be $s_j$.
3. As indicated in step 124, recipient j accepts the message if $s_j \leq c_1 M$, and rejects it if $s_j \geq c_2 M$. If $c_1 M < s_j < c_2 M$, the action taken by recipient j varies with the scenario. For instance, j might consult with the other recipients, as indicated in step 126, to compare the value of s that each has computed. If a sufficiently small number (or percentage) of recipients compute a questionable result s, the message may be deemed acceptable.
4. As indicated at step 128, the recipients discard all used and unused keys.

When $s_j$ is large, the message has been heavily tampered with, and may be invalid. When $s_j$ is small, the message cannot have been changed very much from what Alice sent. The value of $s_j$ is expected to be similar for all recipients, but need not be identical. As we shall see below, these tampering and forgery scenarios are caught using the $c_2$ and $c_1$ thresholds. Forgery is prevented by $c_2$, and cheating by Alice is prevented by a gap between $c_2$ and $c_1$. Alice might attempt to divide the recipients, but she will almost always fail. Alice must take into account the gap between $c_1 M$ and $c_2 M$.

Our scheme is applicable to a variety of cryptographic problems. For instance, Alice may wish to sign a contract with Bob such that Bob can prove to Judge Charlie that the contract is valid. In this case, Bob should accept the contract whenever $s_B < c_1 M$, and Charlie should accept whenever $s_C < c_2 M$. This problem can also be solved by a classical protocol, with the assistance of an anonymous broadcast channel and recipients with distinct private keys. However, it is much simpler to distribute public keys, and we can adapt many classical methods for doing so to our protocol. The swap-tests in the key distribution stage provide an explicit check for key indistinguishability which is implicit in most classical schemes.

The security of this scheme may be proved against two scenarios of cheaters. In the first scenario, only Alice is dishonest; her goal is to get recipients to disagree about whether a message is valid or not (i.e., she wishes to "repudiate" it). We show that if one recipient unconditionally accepts ($s_j < c_1 M$), then it is very unlikely that another will unconditionally reject ($s_j' > c_2 M$).

The second scenario is a standard forging scenario. In this case, Alice and at least one recipient Bob are honest. Other recipients or some third party are dishonest, and they wish to convince Bob that a message $b' \neq b$ is valid. The forgers have complete control of the classical channel used to send the message, but not the quantum channel for the distribution of public keys: Bob always receives a correct set of public keys. (However, we do not assume the cheaters behave honestly during the key verification stage.) Naturally, the forgers can always prevent any message from being received, or cause Bob to reject a valid message, but we do not consider this to be a success for the cheaters.

The security proof for the second scenario is straightforward. In the worst case, the forger Eve has access to all 2t copies of each public key. By Holevo's theorem, Eve can acquire at most 2tn bits of information about each bit string $k_b^j$. When Alice sends the signed message, Eve may attempt to substitute for b a different $b' \neq b$ and (possibly) different values of the $k_b^j$, to go with it. However, since she lacks at least L−2tn bits of information about any public key which Alice has not revealed, she will only guess correctly on about $G = 2^{-(L-2tn)}(2M)$ keys. Furthermore, if she wishes to change a bit for which she did not correctly guess a key's identity, she has only probability $\delta^2$ of successfully revealing the bit. Each recipient measures M keys, so when $b \neq b^1$, each recipient will find (with high probability) that at least $(1-\delta^2)(M-G)-O(\sqrt{M})$ public keys fail. We will pick $c_2$ so that $(1-\delta^2)(M-G) > c_2 M$, which means each recipient either receives the correct message, or rejects the message with high probability.

For the security proof in the first scenario, where Alice is dishonest, we will simplify to the case where there are only two recipients, Bob and Charlie, but the proof can easily be generalized to t>2 recipients. Here, Alice wishes Bob to accept the message and Charlie to reject it or vice-versa. She can prepare any state she wishes for the public keys, including entangled states and states outside the family $|f_k\rangle$. For instance, she can prepare a symmetric state, such as $|\psi\rangle_B|\Phi\rangle_C + |\Phi\rangle_B|\psi\rangle_C$. Because this state is invariant under swaps, it always passes all tests, so that Bob and Charlie believe they have the same key. But that is an illusion, since Alice can nevertheless arrange that they disagree on the validity of the corresponding private key $k_b^j$. However, Alice cannot control which of them receives the valid key; it goes randomly to Bob or Charlie. Thus, since M is large, the difference $|s_B - s_C|$ is $O(\sqrt{M})$ with high probability, which makes it very unlikely that Bob and Charlie will get definitive but differing results. That is, when one of them (say, Bob) accepts a message, that is $s_B < c_1 M$, Charlie almost never rejects it, which would happen if $s_c > c_2 M$. The gap between $c_1 M$ and $c_2 M$ protects them against Alice's machinations.

This may be proved more generally. Our goal is to compute the probability $p_{pcheat}$ that Alice can pass all the swap-tests but achieve $|s_B - s_C| > (C_2 - c_1)M$, meaning that Bob and Charlie disagree about the validity of the message. We do this by studying a global pure state $|\psi\rangle$, which describes all of the public keys as well as any state that Alice may have which is entangled with the keys. Any state which passes the initial swap-tests will be symmetric between the test keys and the kept keys; in fact, it is symmetric between any individual test key and the corresponding kept key. Therefore, we can safely assume Alice prepares $|\psi\rangle$ with this property.

Now, for each set of keys, the most general state is a superposition of two types of terms. A type-1 term passes the swap test, but leaves Bob and Charlie in agreement, on average, about the validity of the keys, while a type-2 term frequently fails the swap test. To perform the decomposition, we expand both the kept keys and the test keys in the basis $|f\rangle|f\rangle$, $|f_\perp^b\rangle|f_\perp^c\rangle$, $|+^a\rangle$, and $|-^a\rangle$, where the first ket is Bob's, the second is Charlie's, the states $|f_\perp^b\rangle$ form an orthonormal basis with $|f\rangle$, and $|\pm^a\rangle = |f\rangle|f_\perp^b\rangle \pm |f_\perp^a\rangle|f\rangle$. A type-1 term is any term for which both the kept and test keys are in a state $|f\rangle|f\rangle$, $|f_\perp^b\rangle|f^b\rangle$, or $|+^a\rangle$. Note that any sum of type-1 terms will always pass the swap test, but also has equal amplitudes for Bob and Charlie to pass key verification. A type-2 term is any term including a $|-^a\rangle$ state for the kept keys, the test keys, or both. For the type-2 terms, we explicitly note the symmetry between the kept and test keys, meaning the superposition $(|+^a\rangle|-^b\rangle + |-^a\rangle|+^b\rangle)/\sqrt{2}$ is the only way $|-^a\rangle|+^b\rangle$ can appear. That is, any sum of type-2 terms respecting this symmetry must have at least a 50% chance of failing the swap test. On the other hand, some superpositions of type-2 terms can give different chances for Bob and Charlie to pass key verification.

Expanding every set of keys in $|\psi\rangle$ in this way gives a global state which we can again divide up into two terms: $|\psi_1\rangle + |\psi_2\rangle$. Every summand in $|\psi\rangle$ contains at most r type-2 tensor factors, where $r = (c_2 - c_1 - c)M$ for some constant $c>0$; the rest are type-1 terms. Each type-1 term has equal amplitude to contribute to $s_B$ and $s_C$, so the tensor product of $M-r$ such terms has a Gaussian distribution of amplitudes, centered at $s_B = s_C = (M-r)/2$ and with width $O(\sqrt{M})$. That is, most of the weight of $|\psi_1\rangle$) falls on cases where $|s_B - s_C| \leq r + O(\sqrt{M}) < (c_2 - c_1 - c)M$. $|\psi_2\rangle$ consists of terms with more than r factors that are type-2 tensors. Since each type-2 term has at least a ½ chance of failing the swap test, $|\psi_2\rangle$ passes with probability no larger than $2^{-r}$. Note that $|\psi_1\rangle$ need not be orthogonal to $|\psi_2\rangle$.

The foregoing constructs can be used to obtain a bound on $p_{cheat}$. The $|\psi_1\rangle$ term might have a good chance of passing all swap tests, but yields an exponentially small chance of giving the required separation between $s_B - s_C$. The $|\psi_1\rangle$ term might have $O(1)$ probability of having $|s_B - s_C| > (c_2 - c_1)M$, but only has an $O(2^{-r})$ chance of passing all swap tests. The best case for constructive interference between the two terms gives a total probability $p_{cheat}$ at most twice the sum of the two probabilities for $|\psi_1\rangle$ and $|\psi_2\rangle$, which is still exponentially small in M. Therefore, Alice has $p_{cheat} \sim O(d^{-M})$ probability of successfully cheating for some $d>1$.

Multi-bit messages can be sent by repeating the above process, using M pairs of public keys for each message bit. However, a much more efficient procedure is to first encode the message in a classical error-correcting code with distance M, and to use a single pair of public keys for each encoded bit. The previous protocol can be viewed as a special case of this using a repetition code. Valid messages are codewords of the error-correcting code; to change from one valid message to another requires altering M bits. Therefore, the above security proof holds with only two changes: G, the number of keys successfully guessed by Eve, is now $2^{-(L-2tn)}(2N)$, where N is the length of the full encoded message. In addition, if Alice attempts to cheat, she can produce a difference $|s_B - s_C| = O(\sqrt{N})$ with type-1 terms. We should thus have M scale linearly with N when the latter is very large.

Note that in a purely classical scheme, the public key can be given out indiscriminately. This cannot be true of a quantum scheme: when there are very many copies of a public key, sufficiently careful measurements can completely determine its state, and therefore one may as well treat the public key as classical. In that case, security must be dependent on conventional computational or similar assumptions. Thus, any quantum digital signature scheme will necessarily require limited circulation of the public key.

The digital signature scheme provided here has many potential applications. It combines unconditional security with the flexibility of a public key system. An exchange of digital signature public keys is sufficient to provide authentication information for a quantum key distribution session. Quantum digital signatures can be used to sign contracts or other legal documents. In addition, digital signatures are useful components of other more complex cryptographic procedures.

One particularly interesting application is to create a kind of quantum public key cryptography. If Bob has Alice's public key, but Alice has nothing from Bob, then Bob can initiate a quantum key distribution session with Alice. Bob will be sure that he is really talking to Alice, even though Alice has no way to be sure that Bob is who he says he is. Therefore, the key generated this way can be safely used to send messages from Bob to Alice, but not vice-versa.

We now turn to implementation of the invention. Both hardware and software can be used to implement a quantum digital signature scheme. In describing the implementation of a quantum digital signature system, a short discussion of quantum states is in order.

A theoretical analysis by Barenco et al., "Elementary gates for quantum computation," Phys. Rev. A, 52: 3457-3467 (1995), demonstrates that any n-bit logic gate to be used in a quantum computer can be constructed from a finite number of one quantum bit and two quantum bit logic gates. Accordingly, it is in principle possible to design such gates using a finite number of components.

One example of quantum computer hardware is based on the use of atomic and subatomic particles as the computational medium. The description of chemical and physical systems at the atomic and subatomic level relies on quantum mechanics. The central concept of quantum mechanics is that observable properties of systems, such as energy, momentum, and spin, are quantized, and appear in units of specific magnitude, or "quanta," rather than being represented by variables that have continuous ranges. For example, the quantum of energy associated with a photon of light is given by the relation Energy=Planck's Constant times the frequency of the photon, or $E = h\nu$.

In quantum systems, measurement of a characteristic of a system in question can effect the value of a physical observable. An example of this phenomenon is expressed in conjunction with the Heisenberg Uncertainty Principle. Under the Heisenberg Uncertainty Principle, certain quantities, such as momentum and position, cannot be simultaneously known to any arbitrary precision, but rather their product will be uncertain to at least $h/2\pi$. Therefore, a measurement that determines a position of a quantum mechanical "particle" with higher precision will perforce lead to a greater uncertainty in the momentum of the "particle."

A related concept in quantum mechanics relates to the possibility that a particle will possess an admixture of every state in which the particle can exist. Upon measurement of the relevant state of the particle, one of the possible states is observed, with a probability given by the relative probability of existence of that state among all the possible states. As an example of this quantum mechanical feature, an electron can have a spin oriented in a direction we can call "up" (e.g., spin +½) and the electron can have a spin oriented in the opposite direction, which we would call "down" (e.g., spin −½). For an electron selected at random from a collection of electrons, the spin state of the electron can be either "up" or "down" with equal probability. This feature is understood in terms of quantum theory as a wavefunction for the electron that includes terms representing both spin states with equal weight, which is known as the superposition of states. The square of the wavefunction gives the probability of the electron having a particular property, so the wavefunction includes the sum of both states normalized with a multiplicative factor of $1/\sqrt{2}$. Upon performing a measurement of the spin of the electron in question, one of the two states is observed, which is equivalent to saying that the observation has "selected" one of the two states present in the superposition of states. Many other observable quantum properties can be used in a similar fashion, including, as examples, the spins of atomic nucleii, and the polarization properties of photons.

An illustrative example of "hardware" that can perform calculations using quantum mechanical systems involves using an electron as a computational device. One can encode information that can be represented as the two possible spins of the electron, for example. By performing logic operations on the electron, which can include subjecting the electron to electromagnetic fields and signals, one can cause the electron to change states in ways that correspond to calculations. One electron can represent a quantum bit, or "qubit." Such a system can be extended to include a plurality of qubits by including more electrons.

A variety of physically realized systems for performing quantum computation or communication have been described. One example, a system that relies on single-photon interference, which performs quantum cryptography over an optical fiber, appears in an article by R. J. Hughes, et al., "Quantum Cryptography," Contemporary Physics, 36: 149-163 (1995).

Another brief review of quantum computing in J. Mullins, "The Topsy Turvy World of Quantum Computing," IEEE Spectrum, 38: 42-49 (February 2001), describes several different embodiments of quantum computational hardware. One example uses nuclear magnetic resonance (NMR) spectroscopy to examine the nuclear spins of specific atoms in molecules, as described in U.S. Pat. No. 5,917,322. A second example uses arrays of donor atoms ($^{31}$P) in a semiconductor host such as silicon with interactions such as the electron-nucleus hyperfine interaction, as explained by B. E. Kane, "A silicon-based nuclear spin quantum computer," Nature, 393: 133-137 (1998). Recent reports in the press (Nature, volume 397, page 594-598, February 1999) have described the work of Prof. Lene Vestergaard Hau and co-workers, who have slowed (or stopped) light in a cryogenic sodium vapor gas, as possible computational tools. A photon that can be trapped or maintained in a cryogenic system can be used to store a qubit, which can be released for transmission at a later time. Further approaches include using isolated trapped quantum objects such as electrons, other subatomic particles or atoms. For example, a stored qubit in the form of a trapped ion can be manipulated to produce exchange its quantum state with another trapped ion.

U.S. Pat. No. 5,307,410 to Bennett describes an apparatus for quantum cryptographic key distribution. U.S. Pat. No. 5,515,438 to Bennett et al. describes another apparatus for quantum cryptographic key distribution. WO 96/06491 describes the use of single photon signals in a quantum cryptographic system. U.S. Pat. No. 5,850,441 to Townsend et al. describes still another apparatus for quantum cryptographic key distribution. Bethune and Risk, "An Autocompensating Fiber-Optic Quantum Cryptography System Based on Polarization Splitting of Light," (IEEE Journal of Quantum Electronics 36:100 (2000)) describe a system in which quantum key distribution using optical signals was performed over a 10 kilometer fiber optic cable.

It is recognized that such quantum computers are capable of computing at speeds much faster than the computational speeds of conventional computers based on semiconductors. One reason for such speed improvements has to do with the possibility of performing many millions of calculations in parallel, for example, using chemical and/or physical interactions at the atomic or molecular level to perform calculations as parallel computational elements. As a consequence of performing many computations simultaneously, one can then interrogate each computational element and obtain a statistically meaningful answer to a specific problem.

Quantum computers can be expected to perform calculations in short time periods that conventional computers cannot complete in reasonable amounts of time. Conventional binary digital computers using transistors fabricated in silicon or other semiconductors can be designed to have logic gates that perform a specific logical or mathematical function. Examples of elementary logic gates include inverters, AND gates, OR gates, NOR gates and NAND ("not AND") gates, which are well known in the electrical engineering and computer science arts. It is understood that each gate has associated therewith a "truth table" that expresses what outcome will result from the provision of specific signals or logic states at the input or inputs of a particular logic gate. More complex structures can be designed using combinations of elementary logic gates that perform specific logical and computational operations, such as memory, addition, multiplication, and other computations, control, hardwired logic, programmable logic, and other functions.

In a manner similar to the construction and use of logic gates in conventional electrical engineering and computer science, quantum computers can be constructed to perform specific logical functions necessary to implement a quantum calculation. Examples of known single qubit logic gates are described in Nielsen and Chuang, and include the X gate, the Z gate and the Hadamard gate, among others. In a similar manner to conventional elementary logic gates, each quantum logic gate has a defined truth table, and performs one or more operations that are conveniently represented in matrix notation on input quantum states, to generate one or more output quantum states, as will be described below. Single qubit logic gates must be unitary.

As an example, an X gate operates as a quantum NOT gate, and exchanges two wavefunctions to produce the complement of an input superposition of states. The matrix notation for the X gate is $$X = \begin{bmatrix} 0 & 1 \\ 1 & 0 \end{bmatrix}.$$

As another example, the Z gate causes a state |0> to be preserved, but causes a state |1> to be converted to the state |−1>. The matrix notation for the Z gate is $$Z = \begin{bmatrix} 1 & 0 \\ 0 & -1 \end{bmatrix}.$$

As a third example, the Hadamard gate creates a pair of orthogonal superposition states from the input pair of states |0> and |1>. The Hadamard gate is represented by the matrix $$H = \frac{1}{\sqrt{2}} \begin{bmatrix} 1 & 1 \\ 1 & -1 \end{bmatrix},$$

and produces from state |0> as output the superposition $$\frac{1}{\sqrt{2}}[|0\rangle + |1\rangle]$$

and produces from state |1> as output the superposition $$\frac{1}{\sqrt{2}}[|0\rangle - |1\rangle].$$

Figure 2:
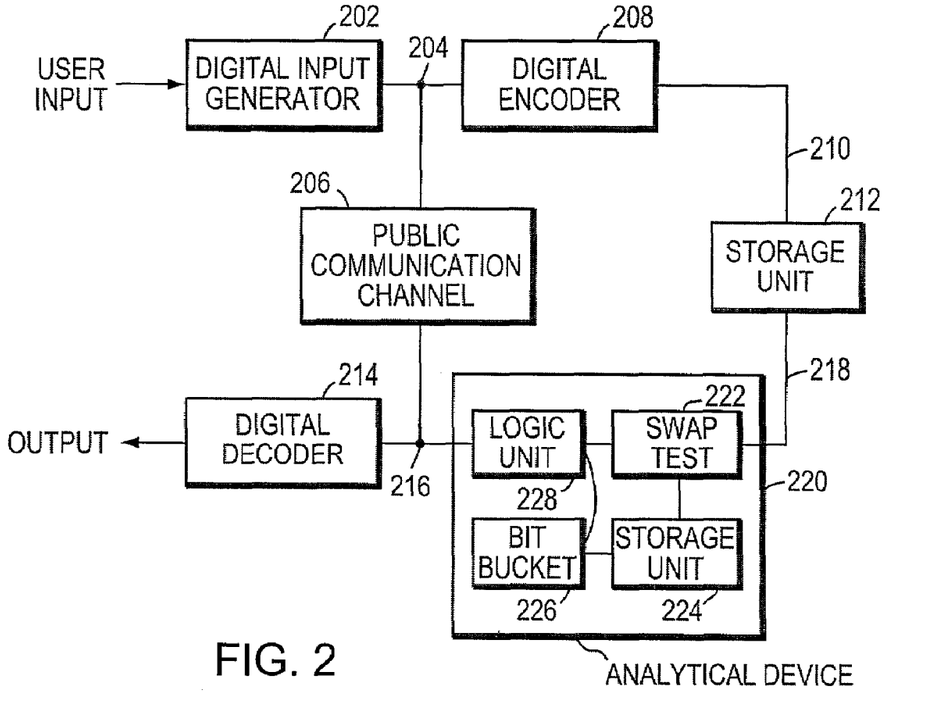
FIG. 2 is a schematic diagram showing an embodiment of hardware that performs computations and other actions to carry out the methods of the invention.

FIG. 2 is a schematic diagram showing an embodiment of hardware that performs computations and other actions to carry out the methods of the invention. The hardware will be described and explained as a unidirectional communication channel from Alice to Bob (and possibly other recipients). As will be recognized by those of ordinary skill in the art, a bidirectional communication can be accomplished by having a second unidirectional channel that communicates in the opposite direction, so as to operate in half-duplex mode. It is also possible to integrate two unidirectional channels so as to operate bidirectionally in full duplex mode.

Beginning with the hardware used by Alice as a transmitter of a quantum digital signature, as well as a message intended to be associated with the quantum digital signature, there is a device which will be referred to as a digital input generator 202 that accepts user input and provides a stream of binary digits as output. Examples of such a digital input generator 202 include personal computers, digital telephones, personal digital assistants (PDAs), and voice recognition systems. More generally, the digital input generator 202 can be any device that accepts sentient user input and produces in response thereto a string of binary digits or signals that encode the user's input. The digital input generator can be programmable or hard-wired. The output 204 of the digital input generator 202 can be switchably connected to either or both of a public communication channel 206 and a digital-to-quantum state encoder 208. The public communication channel 206 can comprise one or more of the telephone system, a computer network such as the Internet, an optical communication system such as a fiber optic network, cellular or satellite communication systems, or a similar publicly accessible communication system.

The digital-to-quantum state encoder 208 is a device that accepts a digital stream as input and produces as an output signal that comprises a quantum state or superposition of a plurality of quantum states. An example is a device that accepts digital signals as input and produces an optical signal comprising photons having polarization behavior responsive to the digital input, such as is described in U.S. Pat. No. 5,515,438. In some embodiments, the optical output is reduced in intensity to represent a photon flux having an average intensity of less than one photon per packet. Examples of such reduced intensity digital to optical quantum state encoders are described in C. H. Bennett, Phys. Rev. Lett. 68:3121 (1992). However, since the precise format of the output signal is not a critical feature of the invention, any device that accepts a digital input signal and produces a responsive quantum state is potentially suitable to perform the functions of the digital-to-quantum state encoder 208.

The output signal of the digital-to-quantum state encoder 208 is introduced into a communication channel 210 adapted to carry communication signals comprising quantum states. In one embodiment, the output signal is the optical output signal described above, and the communication channel 210 is an optical fiber. The communication channel 210 can carry the output signal of the digital-to-quantum state encoder 208 to a storage unit 212, which can store one or more output signals. In some embodiments, the communication channel 210 is part of an optical fiber network. In an embodiment in which the output signal is an optical signal, the storage unit 212 can be a device such as an optical circulator which is well known in the optical arts, or it can be a cryogenic trap of the type described above in which an optical signal can be slowed down virtually to a standstill for storage.

Alice can use the digital input generator 202, the digital-to-quantum state encoder 208, the communication channel 210 and the storage unit 212 to prepare, transmit and store one or more strings, or messages, as output signals in quantum state format at storage unit 212. In particular, Alice can repeatedly introduce a defined string into digital input device 202 with the result that substantially identical output signals are generated. Alice can thus generate a plurality of 2t substantially identical output signals that serve as keys for t recipients. In addition, Alice can also transmit messages in plain text (e.g., unencoded binary digital format) using digital input generator 202 and public communication channel 206.

Turning to the activities of a recipient of a communication, such as Bob, there is present in the system hardware of FIG. 2 a digital decoder 214 that is connected to the public communication channel 206 by way of a switchable input 216. The digital decoder 214 performs the inverse operation to that performed by digital input generator 202, so as to render the digital message sent by Alice over the public communication channel 206 in a form that is meaningful to Bob. In some embodiments, the digital decoder 214 can be a digital computer or PDA, an enunciator such as a printer, a visual display such as a computer monitor or television screen, a telephone, or a similar device that converts a digital stream to a message cognizable by a human recipient. The digital decoder can be programmable or hardwired.

The recipient hardware also includes a quantum state analytical device 220 for extracting one or more output signals from the storage unit 212 by way of a communication channel 218. The communication channel 218 is a channel adapted to handle an output signal in the same manner as communication channel 210 handles an output signal. For example, in embodiments where communication channel 210 is an optical fiber, communication channel 218 is preferably also an optical fiber. In some embodiments, the communication channel 218 is part of an optical fiber network. In the exemplary embodiment in which the storage unit 212 is a cryogenic trap of the type described above in which an optical signal can be slowed down virtually to a standstill for storage, an optical signal can be sent from quantum state analytical device 220 via communication channel 218 to the storage unit 212 to release the output signal, which travels over communication channel 218 to the quantum state analytical device 220.

The quantum state analytical device 220 comprises a swap-test device 222, a local storage unit 224, a quantum "bit-bucket" 226, and a logic unit 228 with associated memory. As described above, Bob can recover from the storage unit 212 two copies of a given output signal that is intended to serve as a key. Bob can store the copies of the output signal in the local storage unit 224. In the case of optical output signals, the local storage unit 224 can be an optical circulator or a cryogenic trap such as is used in storage unit 212. Bob can perform swap tests as described above using swap-test device 222. The result of a swap test can be communicated to the logic unit 228 with associated memory, which unit can compute a value for $c_1M$ and $c_2M$ and can compare such values to a value for s, or the logic unit 228 can retrieve values from its associated memory and can compare those values to any of the computed values, so as to obtain a mathematical relationship between or among values. The quantum "bit-bucket" 226 is provided to receive any quantum output signal that is no longer required. In addition, Bob can transmit a quantum output signal to or receive another quantum output signal from another recipient, who we shall call Sam (and who has access to storage unit 212) by way of communication channel 218 and storage unit 212, or by way of another dedicated communication channel not shown. In this manner, recipients can exchange, or can pass to another, a single copy of a pair of output signals that represent a key, for further swap tests. The result obtained by the logic unit 228 can be communicated to the digital decoder 214 by way of switchable input 216. The recipient, Bob, can thus be informed of the outcome of a swap test as enunciated on digital decoder 214. As described above, Bob can then determine whether an unencoded plain text message sent by Alice is genuine, perhaps by resorting to communication with other recipients such as Sam if the results for s are inconclusive.

All of the patents and publications cited above are incorporated herein in their entirety by reference.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of authenticating information to be sent from a source, such that all of one or more recipients will agree on the authenticity of the source of the information, the method comprising the steps of:
   from a private classical bit key, creating a public quantum bit key to be used in authenticating a digital signature associated with the information;
   making at least one identical copy of the public quantum bit key for each recipient; and
   sending at least one copy of the public quantum bit key to each recipient.

2. The method of claim 1 wherein the public quantum bit key is created in accordance with a quantum one-way function whose input is a classical bit key and whose output is a quantum state key.

3. The method of claim 1 wherein the private classical bit key comprises a string of classical bits and the public quantum bit key comprises a string of quantum bits.

4. A method of authenticating information received from a source, such that all of one or more recipients will agree on the authenticity of the source of the information, the method comprising the steps of:
   receiving a one-way classical to quantum function and at least one copy of a public quantum bit key from the source, the received copy being identical to copies sent to all other recipients;
   receiving the information and a classical bit digital signature associated with the information; and
   applying the one-way function to the digital signature and comparing the result to the received copy of the public quantum bit key in order to determine the validity of the digital signature.

5. The method of claim 4 wherein the private classical bit key comprises a string of classical bits and the public quantum bit key comprises a string of quantum bits.

6. The method of claim 4 wherein the one-way classical to quantum function transforms classical information into at least one quantum state.

7. A method of creating a digital signature for use in electronic commerce, comprising the steps of:
   from a private classical bit key, creating a public quantum bit key to be used by at least one recipient for authenticating the digital signature;
   making at least one copy of the public quantum bit key for sending to each intended recipient of the digital signature; and
   creating a digital signature from the private classical bit key.

8. The method of claim 7 wherein the step of creating the public key comprises creating a one way classical to quantum function and applying the function to the private classical bit key to create the public key.

9. The method of claim 8, further comprising the step of publishing the copies of the public key and the associated one way classical to quantum function.

10. The method of claim 7, further comprising the step of associating the digital signature with information for transmission in commerce.

11. The method of claim 10, further comprising the step of determining the authenticity of the digital signature.

12. The method of claim 8, further comprising the step of providing for verification of the authenticity of the published public keys.

13. The method of claim 11 wherein the step of determining the authenticity of the digital signature comprises employing a one way classical to quantum function to verify that the digital signature maps to the public key.

14. A system for providing a digital signature, comprising:
   a digital input generator for accepting user input and providing binary digits as output, the digital input generator being connectable to a public communication channel for communication of information having an associated digital signature; and a digital to quantum state encoder for mapping, according to a one way classical to quantum function, a binary digit private key received from the digital input generator to a set of quantum states together embodying a public key, the encoder being connectable to a quantum communication channel used for communication of the one way classical to quantum function and at least one copy of the public key to each intended recipient.

15. The system of claim 14, further comprising.

a digital decoder connectable to the public communication channel over which the digital signature is communicated; and a quantum state analytical device, connectable to a quantum communication channel, for receiving the one way classical to quantum function and at least one copy of the public key for use in determining whether the digital signature is authentic.

16. A system for validating a digital signature, comprising:

a digital decoder connectable to a public communication channel over which the digital signature is communicated; and a quantum state analytical device, connectable to a quantum communication channel, for receiving at least one copy of a quantum bit key that has been sent to all recipients, for verifying the authenticity of the quantum bit key, and for determining the authenticity of the digital signature.

17. The system of claim 16, further comprising:

a digital input generator for accepting user input and providing binary digits as output, the digital input generator being connectable to the public communication channel over which the digital signature is communicated; and a digital to quantum state encoder for mapping a binary digit key received from the digital input generator to a set of quantum states together embodying the quantum key keys, the encoder being connectable to a quantum communication channel for communication of the quantum key.

18. The method of claim 2, further comprising the step of distributing and providing for authentication of the copies of the public key.

19. The method of claim 18, wherein the step of distributing and providing for authentication of the set copies of the public key comprises the steps of:

making two copies of the public key available to each intended recipient; and providing at least one public key verification method for use on the copies of the public key received by each intended recipient.

20. The method of claim 18, further comprising the step of providing for authentication of the digital signature associated with the information.

21. The method of claim 3, further comprising the step of providing for authentication of the digital signature by the steps of:

using a subset of the set of classical bits to create the digital signature; and providing at least one signature verification method for use by each intended recipient to determine whether the digital signature is authentic.

22. The method of claim 21, wherein the signature verification method employs the quantum one-way function to determine whether each classical bit of the digital signature maps to a corresponding quantum bit in the public key.

23. The method of claim 4, further comprising the step of authenticating the received public key.

24. The method of claim 23, wherein the step of authenticating the public key comprises the step of using at least one public key verification method on the public key.

25. The method of claim 24, wherein at least one public key verification method employs a quantum swap test.

26. The method of claim 4, further comprising the steps of:

selecting the private classical bit key; and from the private classical bit key, creating the public quantum bit key.

27. The method of claim 26 wherein the public quantum bit key is created by application of the one-way classical to quantum function to the private classical bit key.

28. The system of claim 14, further comprising a quantum storage unit for storing the quantum key in quantum state format, the quantum storage unit being connectable to the quantum communication channel.

29. The system of claim 15, the quantum state analytical device comprising:

a swap-test device for verifying the authenticity of the quantum key; and a logic unit for analyzing the results obtained from the swap-test device and for assessing the authenticity of the received digital signature.

30. The system of claim 16, further comprising a quantum storage unit for storing the quantum key in quantum state format, the quantum storage unit being connectable to the quantum communication channel.

31. The system of claim 16, the quantum state analytical device comprising:

a swap-test device for verifying the authenticity of the quantum key; and a logic unit for analyzing the results obtained from the swap-test device and for assessing the authenticity of the received digital signature.

* * * * *